(12) United States Patent
Hohmann et al.

(10) Patent No.: US 10,017,365 B2
(45) Date of Patent: Jul. 10, 2018

(54) STANDING PLATFORM FOR AN INDUSTRIAL TRUCK

(71) Applicant: Jungheinrich Aktiengesellschaft, Hamburg (DE)

(72) Inventors: Michael Hohmann, Leipzig (DE); Frank Schladebach, Groest (DE)

(73) Assignee: Jungheinrich Aktiengesellschaft (DE)

( * ) Notice: Subject to any disclaimer, the term of this patent is extended or adjusted under 35 U.S.C. 154(b) by 73 days.

(21) Appl. No.: 15/205,612

(22) Filed: Jul. 8, 2016

(65) Prior Publication Data

US 2017/0008742 A1   Jan. 12, 2017

(30) Foreign Application Priority Data

Jul. 10, 2015   (DE) ........................ 10 2015 111 178

(51) Int. Cl.
| | |
|---|---|
| *B66F 9/075* | (2006.01) |
| *B62B 5/08* | (2006.01) |
| *B62D 51/02* | (2006.01) |
| *B62D 51/04* | (2006.01) |
| *B62D 33/06* | (2006.01) |
| *B62B 3/06* | (2006.01) |

(52) U.S. Cl.
CPC .............. *B66F 9/0759* (2013.01); *B62B 3/06* (2013.01); *B62B 5/087* (2013.01); *B62D 33/0604* (2013.01); *B62D 51/02* (2013.01); *B62D 51/04* (2013.01)

(58) Field of Classification Search
CPC .......... B66F 17/003; B66F 9/12; B66F 9/075; F16M 11/04

USPC ..... 108/51.11; 414/699, 592, 434, 426, 639, 414/814
See application file for complete search history.

(56) References Cited

U.S. PATENT DOCUMENTS

| | | | | |
|---|---|---|---|---|
| 3,416,109 A | * | 12/1968 | Russes | .................. B66F 17/003 |
| | | | | 182/148 |
| 3,850,323 A | * | 11/1974 | Ekstrom | ............... B66F 17/003 |
| | | | | 414/636 |

(Continued)

FOREIGN PATENT DOCUMENTS

| | | |
|---|---|---|
| DE | 601 17 956 T2 | 11/2006 |
| DE | 10 2005 045 505 A1 | 3/2007 |

(Continued)

*Primary Examiner* — Jose V Chen
(74) *Attorney, Agent, or Firm* — Barclay Damon, LLP

(57) ABSTRACT

A standing platform for an industrial truck includes a spring arrangement abutting the platform when subject to a weight. A first spring section with a soft characteristic is initially deformed under load, and after a predetermined spring path of the first spring section, a second spring section with a harder spring characteristic is deformable. A sensor detects deformation of the first spring section for generating a release signal. The platform can be folded on a horizontal shaft including a lever arm arranged on a side of the shaft opposite the platform, and abuts the spring arrangement from below which is supported on the truck frame. The first spring section is arranged between a seat for the first spring section and a spacer supported on the second spring section. The spacer acts on the second spring section when the first spring section is initially deformed under a load upon the platform.

9 Claims, 2 Drawing Sheets

(56) References Cited

U.S. PATENT DOCUMENTS

| | | | | |
|---|---|---|---|---|
| 5,465,807 A * | 11/1995 | Josephs | .................. | A01D 75/20 |
| | | | | 180/274 |
| 6,279,306 B1 * | 8/2001 | Langen | .................. | B65H 49/38 |
| | | | | 19/159 A |
| 9,230,419 B2 * | 1/2016 | Beggs | .................. | B60Q 1/2673 |
| 9,617,134 B2 * | 4/2017 | Swift | .................... | B60Q 5/005 |
| 2004/0162695 A1 * | 8/2004 | Tanaka | .................. | B60K 28/02 |
| | | | | 702/127 |
| 2004/0239138 A1 * | 12/2004 | Kamiya | ................ | B66F 17/003 |
| | | | | 296/68.1 |
| 2005/0270147 A1 * | 12/2005 | Lewis | ................... | B60K 28/08 |
| | | | | 340/439 |
| 2009/0107774 A1 * | 4/2009 | Hoff | ................... | B66F 9/07586 |
| | | | | 187/226 |
| 2010/0063682 A1 * | 3/2010 | Akaki | ................... | B66F 17/003 |
| | | | | 701/42 |
| 2010/0250073 A1 * | 9/2010 | McCabe | .................. | B66F 9/24 |
| | | | | 701/50 |
| 2010/0284773 A1 * | 11/2010 | Brown | ................. | B62D 51/005 |
| | | | | 414/665 |
| 2013/0197760 A1 * | 8/2013 | Castaneda | ........... | B66F 9/07581 |
| | | | | 701/41 |
| 2013/0275012 A1 * | 10/2013 | Nicholson | ............... | E02F 3/432 |
| | | | | 701/50 |
| 2014/0102814 A1 * | 4/2014 | Grison | ...................... | B66F 9/24 |
| | | | | 180/19.2 |
| 2014/0277871 A1 * | 9/2014 | Goncalves | ................ | B66F 9/24 |
| | | | | 701/22 |
| 2014/0277958 A1 * | 9/2014 | Yahner | .................. | B66F 9/0755 |
| | | | | 701/50 |
| 2015/0225218 A1 * | 8/2015 | Strand | ..................... | B66F 9/065 |
| | | | | 701/50 |
| 2016/0214556 A1 * | 7/2016 | McGoldrick | ..... | B60R 21/01516 |

FOREIGN PATENT DOCUMENTS

| | | |
|---|---|---|
| DE | 10 2006 009 331 A1 | 9/2007 |
| EP | 2 336 009 A1 | 6/2011 |
| EP | 2 360 083 A1 | 8/2011 |
| EP | 2 336 009 B1 | 1/2013 |
| JP | 2002-145128 A | 5/2002 |

\* cited by examiner

STANDING PLATFORM FOR AN INDUSTRIAL TRUCK

CROSS REFERENCE TO RELATED APPLICATION

This application claims priority under relevant portions of 35 U.S.C. § 119 to German Patent Application No. 10 2015 111 178.0, filed Jul. 10, 2015. The entire contents of this application are herein incorporated by reference.

TECHNICAL FIELD

The invention relates to a standing platform for an industrial truck.

DESCRIPTION OF PRIOR ART

Standing platforms for industrial trucks are normally designed cushioned. This ensures that jolts acting on the lift truck while driving are only conveyed to the operator dampened. The cushioning of the standing platform is normally realized by affixing at least one damping element between the standing platform and a frame component of the lift truck. It is furthermore known to equip standing platforms with a presence sensor for an operator.

DE 10 2006 009 331 A1 discloses pretensioning an articulated platform by means of a spring. The spring is supported on a buffer element. Furthermore, a position sensor is arranged between the platform and frame. The position sensor is activated when the standing platform swings down under the force of weight against the buffer element.

DE 10 2005 045 505 A1 discloses a standing platform in which the standing platform is pretensioned by a spring arrangement. The spring arrangement consists of an elastomer, conical buffer element surrounded by a helical spring which pretensions the standing platform. Under the force of weight, first the helical spring is deformed until the platform lies against the buffer element. This movement is detected by a proximity sensor.

EP 2 336 009 B1 discloses a foldable standing platform that is folded up against the rear wall of the vehicle while operating the industrial truck while walking and is folded down as needed during operation while driving. The foldable platform is pivotable about a horizontal shaft and, on the opposite side of the shaft, has pins which lie against a spring arrangement. Under a load, the spring arrangement is deformed and provides a damping of the platform when traveling over uneven surfaces and obstacles.

BRIEF DESCRIPTION

The underlying object of the invention is to create effective damping of the foldable platform that simultaneously enables the response of a sensor under relatively slight weight.

This object is achieved by the features of the claims.

More specifically and according to the invention, the platform is foldable in a known manner on a horizontal shaft and is provided with a lever arm that lies on the opposite side of the shaft and lies against the spring arrangement from below which in turn is supported on the frame of the industrial truck. The lever arm is therefore arranged on the side of the shaft opposite the platform. The first spring section is arranged between a seat for the first spring section and a spacer that in turn acts on the second spring section when the first spring section is initially deformed in the event of a load upon the platform.

The first spring section has a relatively soft characteristic which causes it to experience a greater change in length than the second spring section under the same load. The deformation of the first spring section is limited by the spacer. This is followed by the subsequent spring effect by means of the second spring section. If the latter were used exclusively, the spring characteristic would necessarily be configured in correspondence with the load in driving mode so that, for example, only a slight path would be traveled under a load of 10 kg. This load should however generate a release signal. By integrating a first spring section with a soft characteristic, the spring characteristic thereof can be selected so that the spacer lies against the second spring element when there is a relatively small platform load of 10 kg to 15 kg, and the second spring element becomes active. This is then configured so that for example a 120 kg individual can comfortably drive over an obstacle.

According to one embodiment of the invention, the sensor measures a position of the lever arm, for example with the assistance of an electric or magnetic sensor. The sensors can also be integrated in the spring arrangement according to one embodiment of the invention. Another possibility according to the invention is to detect the change in position of the lever arm with the assistance of a microswitch.

According to another embodiment of the invention, the first spring section is a spring ring that is arranged in a recess of a spacer ring and, in an unloaded state, projects beyond the assigned, i.e., top surface of the spacer ring, and the spacer ring abuts the second spring section. The spring ring, spacer ring and part of the cylindrical, second spring section are preferably arranged in a hollow cylindrical spring seat.

According to another embodiment of the invention, the first and/or second spring section are formed by an elastomer.

In the case of a spacer ring, the electric or magnetic sensor, or the microswitch as well, can be integrated in the spacer ring.

An exemplary embodiment of the invention will be explained in greater detail below with reference to drawings.

DETAILED DESCRIPTION

Figure 1:
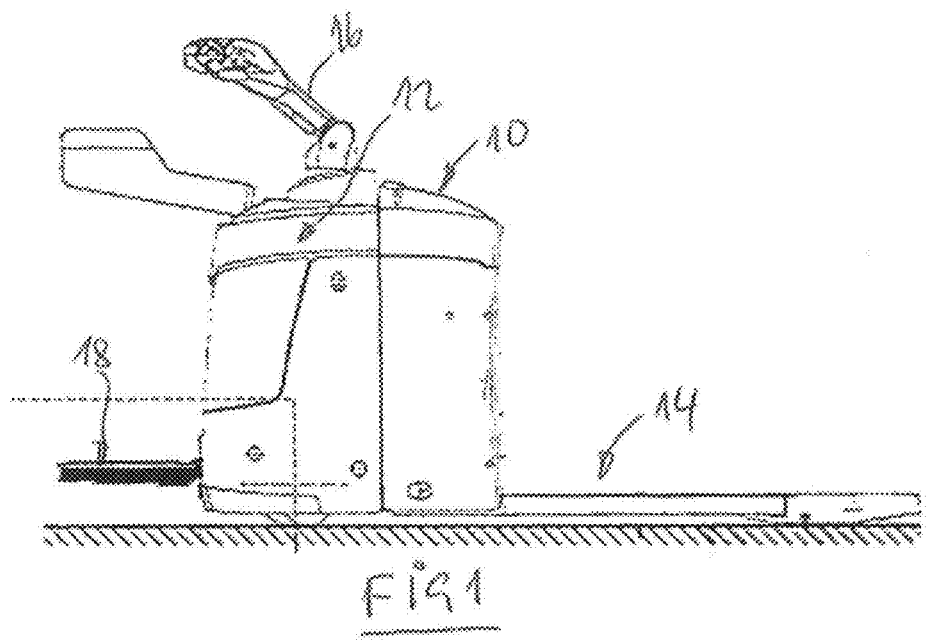
FIG. 1 shows a highly schematic side view of an industrial truck with a foldable standing platform.
Figure 2:
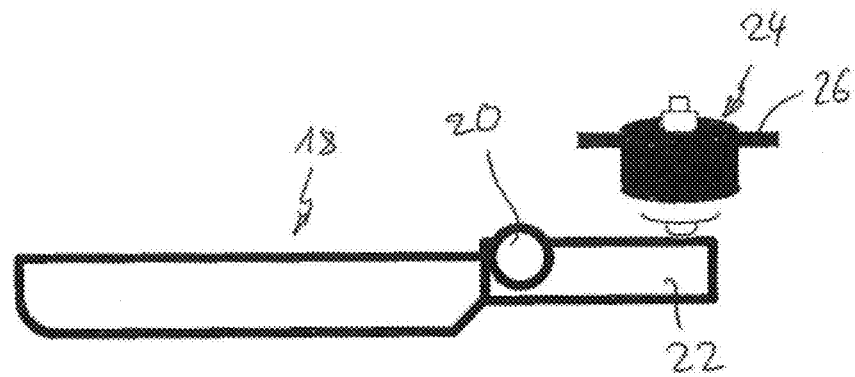
FIG. 2 shows an enlarged standing platform according to FIG. 1 with a spring arrangement according to the invention.

FIG. 1 schematically portrays an industrial truck 10 with a drive part 12 and a load part 14. A draw bar 16 is mounted on the drive part. In the rear end, a standing platform 18 is rotatably mounted about a horizontal shaft. In FIG. 1, it is shown folded down and can therefore enable driving operation. In walking operation, the platform is folded up against the rear wall of the industrial truck 10. In FIG. 2, the standing platform 18 is depicted schematically. The horizontal pivot shaft is indicated with 20. It can be seen that on the side of the shaft 20 opposite the platform 18, a lever arm 22 is arranged that lies against a spring arrangement 24 from below that, as can be seen at 26, is mounted on the frame of the industrial truck 10. The spring arrangement 24 dampens the jolts when an operator stands on the platform 18. In addition, the spring arrangement 24 is assigned a release sensor that emits a signal when the platform 18 is subject to a weight such as 10 kg to 15 kg, i.e., a load that lies far below to the weight of an operator.

Figure 3:
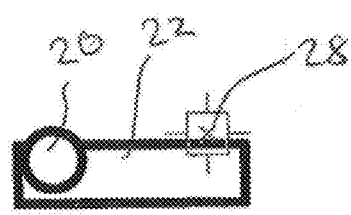
FIG. 3 shows the lever arm of the platform according to FIG. 2 with a first position sensor.

Such a sensor is for example attached in FIG. 3 and is identified with 28. It can act electronically or magnetically or also be designed as a microswitch. It is connected to the control circuit of the industrial truck 10 that only permits the vehicle to start operating when a release signal is sent by the sensor 28.

Figure 4:
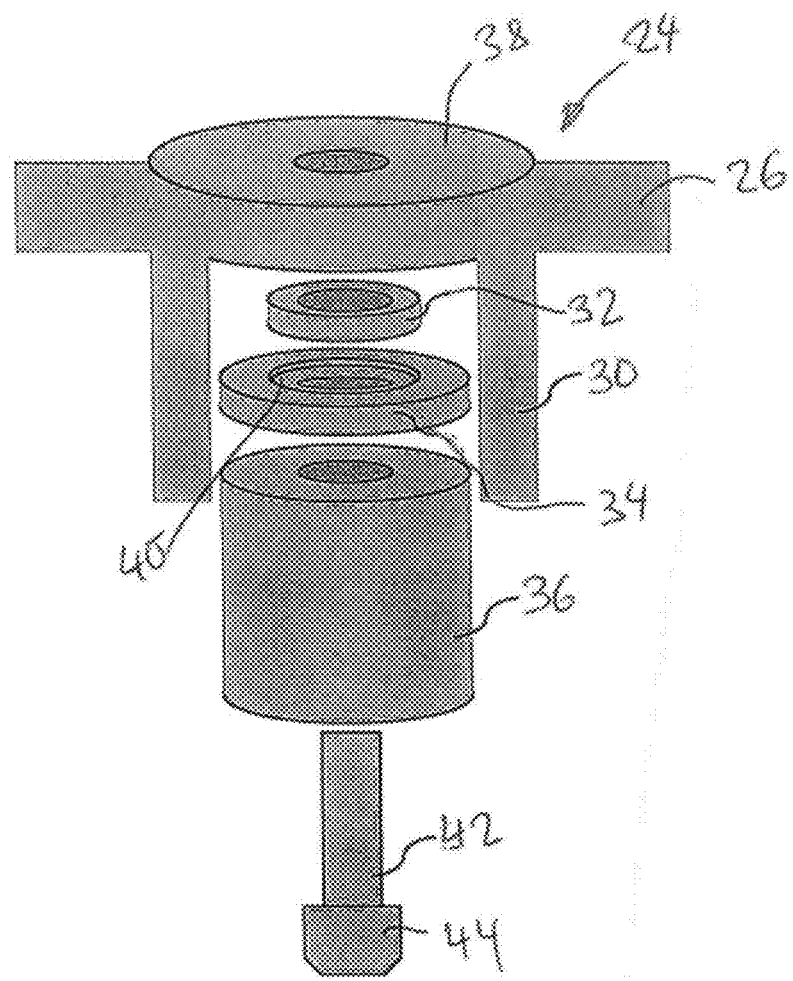
FIG. 4 shows a perspective view of a spring arrangement according to the invention.

An annular spring 32, spacer ring 34 and cylindrical buffer element 36 are accommodated in a recess 30 with a hollow cylindrical interior. In FIG. 4, these parts are depicted in an exploded view. In an installed state, the spacer ring 34 lies against a cover section 38 of the recess 30. The spring ring 32 is seated in a circular recess 40, wherein its height is however greater than the depth of the recess 40 when the spring ring 32 is in a relaxed state. The spacer ring 34 abuts the cylindrical buffer element 36. The shaft of a guide pin 42 extends through the cover section 38, spring ring 32, spacer ring 34 and buffer element 36, the head 44 of the guide pin lying against the bottom side of the buffer element 36.

The spacer ring 34 and buffer element 36 are guided vertically in the recess 30.

The spring characteristic of the spring ring 32 that for example is formed from an elastomer is relatively soft. When there is a weight load of for example 10 kg to 15 kg on the platform 18, the spring ring deforms until it disappears into the recess 40, and the spacer ring 34 abuts the cover 38. An additional load, for example from the weight load of a 120 kg operator, is directly transferred from the spacer ring 34 to the buffer element 36 which for its part consists of an elastomer. Under a small weight that leads to deformation of the spring ring 32, the deformation of the buffer element 36 is negligible.

The deformation path of the spring ring 32 is detected by a suitable sensor. This occurs as for example depicted in FIG. 3. It is, however, also possible to integrate a sensor in the spring arrangement according to FIG. 4, for example by installing an electronic or inductive sensor in the spacer ring 34, or by integrating a microswitch into the spacer ring 34.

The invention claimed is:

1. A standing platform for an industrial truck having a frame, the standing platform having a standard surface for a driver of the industrial truck that is hinged at the frame for movement about a horizontal shaft between a horizontal position and an upright position, the standing platform having a lever arm on a side of the horizontal shaft opposite to the standard surface, the lever arm abutting a spring arrangement from below when the standing platform is in the horizontal position, the spring arrangement being mounted on the frame and comprising a first spring section located between a spring seat on the frame and a spacer, the spacer being supported by one end of a second spring section, the other end of the second spring section being loaded by the lever arm, wherein the first spring section has a soft spring characteristic and the second spring section has a spring characteristic that is harder than the spring characteristic of the first spring section, wherein and upon a load on the standing surface, the first spring section is initially deformed until the spacer engages the spring seat and in which additional load on the standing surface causes a deformation of the second spring section in dependence of the magnitude of the load on the standing surface, the standing platform further having a sensor for detecting the deformation of the first spring section for generating a release signal for the industrial truck.

2. The standing platform according to claim 1, wherein the sensor detects a position of the lever arm when the platform is in the horizontal position.

3. The standing platform according to claim 1, wherein the sensor is integrated in the spring arrangement.

4. The standing platform according to claim 1, wherein the first spring section is a spring ring that is arranged in a recess of a spacer ring and, in the unloaded state of the platform, projects beyond a surface of the spacer ring facing the spring seat, and the spacer ring lying against the second spring section.

5. The standing platform according to claim 4, wherein the spring ring, the spacer ring and a part of the cylindrical second spring section are located in a hollow cylinder of the spring seat.

6. The standing platform according to claim 1, wherein at least one of the first and the second spring sections are formed by an elastomer.

7. The standing platform according to claim 1, wherein an electric or magnetic sensor is integrated in the spring arrangement.

8. The standing platform according to claim 1, wherein a microswitch is integrated in the spring arrangement.

9. The standing platform according to claim 8, wherein the microswitch is integrated in the spacer ring.

* * * * *